United States Patent [19]

Curtil

[11] 3,974,804

[45] Aug. 17, 1976

[54] EXPLOSION ENGINE WITH SEVERAL COMBUSTION CHAMBERS

[75] Inventor: Remi Curtil, Zurich, Switzerland

[73] Assignee: Motosacoche S.A., Geneva, Switzerland

[22] Filed: Sept. 18, 1974

[21] Appl. No.: 507,250

[30] Foreign Application Priority Data

Sept. 26, 1973 Switzerland ........................ 13807/73

[52] U.S. Cl. ........................ 123/59 BM; 123/119 C

[51] Int. Cl.² ........................................ F02C 75/20

[58] Field of Search ......... 123/59 EC, 59 BM, 65 E, 123/119 A, 119 C, 1 R; 60/312, 313, 314

[56] References Cited

UNITED STATES PATENTS

| | | | |
|---|---|---|---|
| 1,312,387 | 8/1919 | Connolly | 123/59 EC |
| 1,332,803 | 3/1920 | Chorlton | 123/1 R |
| 1,669,763 | 5/1928 | King | 123/59 EC |
| 2,245,890 | 6/1941 | Wydler | 123/59 BM |
| 2,284,732 | 6/1942 | Griswold et al. | 123/119 C |
| 2,446,094 | 7/1948 | Mattice | 123/59 EC |
| 2,506,566 | 5/1950 | Boyer | 123/1 R |

FOREIGN PATENTS OR APPLICATIONS

| | | | |
|---|---|---|---|
| 360,351 | 10/1922 | Germany | 123/59 EC |

*Primary Examiner*—Wendell E. Burns
*Assistant Examiner*—David D. Reynolds
*Attorney, Agent, or Firm*—Emory L. Groff, Jr.

[57] ABSTRACT

Two cylinders of a Diesel or gasoline engine are connected by a pipe leading into ports of the combustion chambers which are simultaneously uncovered by the respective pistons at the beginning of the exhaust phase of one chamber and the end of the intake phase of the other. During this temporary communication, the residual energy of the exhaust gases in said one chamber compels air in said tube to supercharge said other chamber. Passageways are provided in the pistons which connect said pipe with air inlet and exhaust manifolds to ensure scavenging of the pipe between the supercharging periods.

6 Claims, 10 Drawing Figures

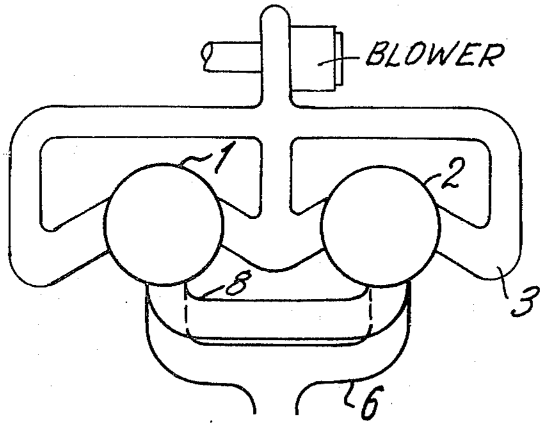
FIG. 1
FIG. 2
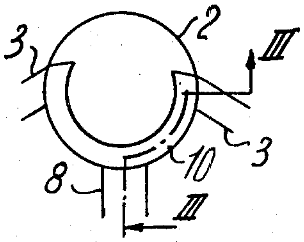
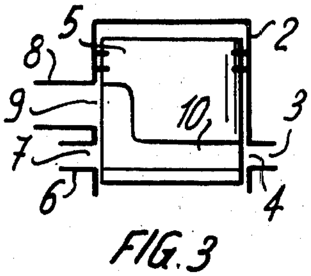
FIG. 3
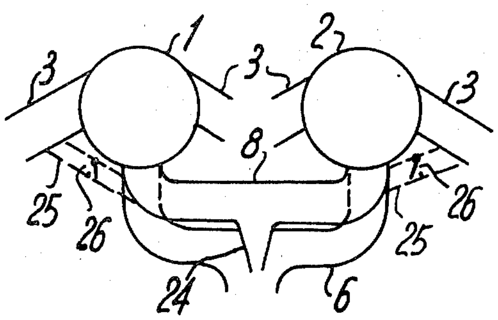
FIG. 4
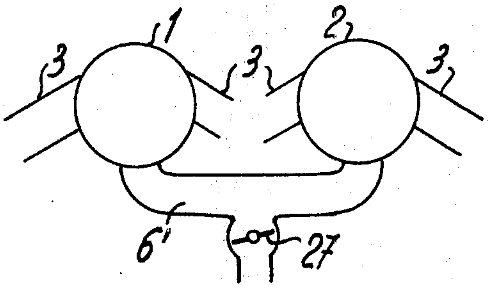
FIG. 5
FIG. 6
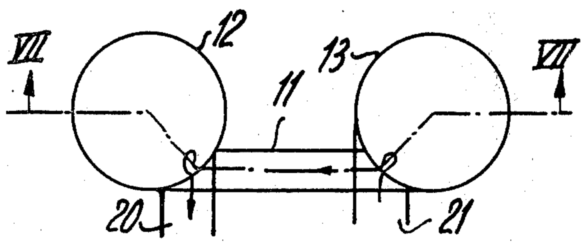

EXPLOSION ENGINE WITH SEVERAL COMBUSTION CHAMBERS

The invention relates to explosion type internal combustion engines having several combustion chambers and at least one mobile member submitted to the pressure in these chambers.

It has already been proposed to improve the charging of an internal combustion engine by means of a device setting up a temporary communication between two chambers periodically having an overlap during periods at the beginning of the exhaust phase for one and the end of the intake phase for the other, in a manner to use the residual energy of the exhaust gases of said one chamber to supercharge said other chamber at the end of its intake phase.

A device of this type is, for example, described in the W. German published patent application No. 1,601,971. This known device is formed by a complicated rotary mechanical piece and is only suitable for radial engines if a further increase in its complexity is to be avoided.

An object of the invention is to enable the supercharging of Diesel and gasoline internal combustion engines by particularly simple means.

The invention therefore provides, in an engine of the aforementioned type, the improvement wherein said temporary communication means is formed by a fixed conduit having two ends leading into respective ports in said two chambers, said ports being disposed to be uncovered by said at least one mobile member during said periods and comprising means for scavenging said conduit between said periods.

Two embodiments of engines according to the invention, and variations thereof, are shown, by way of example, in the accompanying schematic drawings, in which:

FIG. 1 is a schematic plan view of a two-phase engine with two cylinders;

FIG. 2 is a schematic cross-section through a piston and cylinder of the engine of FIG. 1, taken perpendicuar to the axis of the cylinder;

FIG. 3 is a cross-section taken along line III—III of FIG. 2;

FIGS. 4 and 5 show two variations of the engine according to FIGS. 1 to 3;

FIG. 6 is a schematic cross-section of a second embodiment in the form of a four-phase engine with two cylinders;

Figure 7:
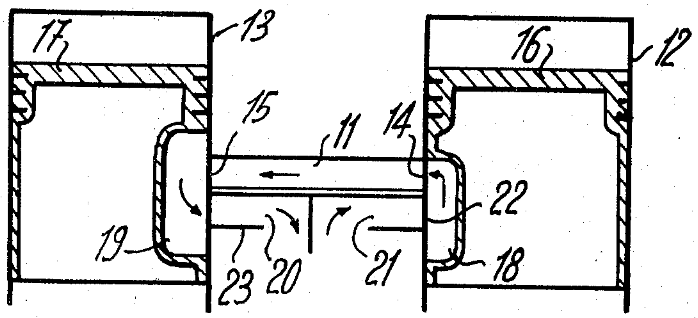
FIG. 7 is a cross-section taken along line VII—VII of FIG. 4.

The embodiment schematically shown in FIGS. 1 and 2 is a two-phase engine with two cylinders 1 and 2 having inlet pipes 3 supplied with pure air by a blower, for the delivery of scavenging air in a conventional manner via inlet ports 4 when these ports are uncovered by the respective piston 5 as it arrives in its lower position.

The engine also has an exhaust manifold 6 for removing the burnt gases via exhaust ports 7 which are also uncovered in a conventional manner when the respective piston approaches the bottom dead center.

Supercharging of the cylinders is provided by a conduit formed by a tube 8 connecting the two cylinders 1 and 2, and leading into each cylinder at a port 9 disposed higher than the exhaust port 7. In this manner, during ignition in one of the cylinders, the piston 5 moves down and uncovers firstly the port 9 then the port 7. During the opening of port 9, the combustion gases engage in the tube 8 and propel the air in this tube into the other cylinder whose piston is moving up but has not yet covered the port 9. Hence, in the cylinder undergoing the compression stroke, the ports 4 and 7 are already closed, whereas the port 9 is still open and enables the introduction of additional air under pressure under the effect of the propulsion of the gases resulting from ignition in the other cylinder. It is clear that the quantity of additional air supplied depends on the dimensions of tube 8 and the shape of ports 9.

After the supercharging of one cylinder, the tube 8 contains the major part of the burnt gases and it is necessary to drain it in order to ensure that during the subsequent ignition this tube 8 will enable a supercharging with compressed air. For this purpose, each piston 5 has a passage 10 connecting the additional port 9 with the inlet ports 4 of the same cylinder when the piston is in the upper position. In this manner, the air supplied by the blower through the inlet pipes 3 of the cylinder whose piston 5 is in the upper position, passes through the passage 10 to cool the piston 5 and drain the tube 8 by driving out the burnt gases contained therein and evacuating them into the other cylinder whose piston 5 is in the lower position, i.e. in the scavenging stroke.

It is not essential for the inlet pipes 3 to be supplied by a blower. The possibility of operation without a blower is particularly interesting in the case of two stroke port-scavenged engines. In this case, a self-scavenging can be obtained by a dynamic cycle corresponding to that which constitutes the principle of the known complex supercharging apparatus. In the application of this principle, the arrangement is such that the pressure wave from the exhaust of one cylinder is propagated in the pipe 8 and impinges with the port of the other piston at the moment of closure thereof. This wave is thus reflected and comes back to the cylinder in the scavenging stroke and passes into the exhaust, producing behind it a suction which sucks in fresh air from the tube 8 through the passage 10 of the piston in the upper position.

The device of FIGS. 1 to 3 was described for the case of a two cylinder engine in which the angular displacement of the driven shaft between two successive combustions is 180°. It is however clear that the same arrangement is suitable for engines having a greater number of cylinders operatively disposed at 180° or for groups of three cylinders at 120°.

FIG. 4 shows a variation of the engine of FIGS. 1 to 3. According to this variation, the tube 8 has in its median part an outlet forming a nozzle 24 disposed in the exhaust manifold 6, coaxial with the outlet of manifold 6 so that the exhaust gases passing through manifold 6 create a depression in the nozzle 24. In this manner, the scavenging of tube 8 is facilitated, the fresh air penetrating alternately through each end of tube 8 and the burnt gases being removed from the middle of this tube by the nozzle 24. Hence, for each scavenging period, one half of tube 8 receives fresh air by the passage 10 of one piston, whereas the other half of tube 8 receives a certain quantity of fresh air from scavenging of the cylinder containing the other piston.

According to an optional feature indicated in dashed lines in FIG. 4, the tube 8 may have, at each end, a pipe 25 connected to the blower, this pipe 25 containing an automatic valve 26 preventing the passage of gases into the blower during the supercharging period, but allowing the supply of fresh air by the two ends of tube 8 during scavenging thereof.

According to another variation, shown in FIG. 5, the tube and the manifold are formed by a single pipe 6′ leading into ports equivalent to ports 7 and 9 of FIGS. 1 to 3, their respective inner spaces thus being common. To permit supercharging, the engine is provided with a periodic obturating member 27 disposed at the outlet of the exhaust manifold. This member 27 could, for example, be a rotary plug valve. The member 27 at least partially obturates the manifold at the moment of the beginning of an exhuast phase of one cylinder, so that the pressure of the exhaust gases propels the air in the manifold into the other cylinder which is at the end of the intake phase. Then, the obturating member 27 opens to permit normal exhaustion of the cylinder in the exhaust phase and the scavenging of at least a part of the manifold 6′, this scavenging being produced during the scavenging stroke of the cylinder in question. This arrangement enables the avoidance of loss of fuel via the exhaust.

FIGS. 6 and 7 concern an embodiment of a two-cylinder four-phase internal combustion engine. To simplify the drawing, the distributing valves and the inlet and exhaust manifolds, which are all of conventional construction, have been omitted.

In this four-phase engine, the two cylinders 12 and 13 are operatively disposed at 360° to one another i.e. with the pistons 16 and 17 in phase, such as in an in-line or a "boxer" engine, and supercharging is provided by a conduit in the form of a tube 11 which communicate the cylinders 12 and 13 by ports 14 and 15. These ports are uncovered by the pistons 16 and 17 when the pistons arrive in the lower position. In this manner, when one cylinder is at the beginning of the exhaust phase, and the other cylinder is thus at the end of intake, before the respective lower dead centers, the gases under pressure in the first cylinder engage in the tube 11 and propel the air therein into the cylinder at the end of the intake phase. When the pistons move back up, the communication via tube 11 is interrupted due to obturation of the ports 14 and 15 by pistons 16 and 17. In this embodiment, it can be advantageous to arrange that the time of opening of the valves is less than in conventional engines.

After supercharging, the tube 11 is filled with burnt gases which are removed by scavenging when the two pistons are in the upper position. For this purpose, each piston 16, 17 has a passage 18, 19 one of which, 18, connects port 14 with a port 20 controlling a conduit 21 supplied with fresh air by a blower. The passage 19 of the other piston 17 connects port 15 with an evacuation conduit 22 by a port 23. Hence, each time that the two pistons are in the upper position, the burnt gases in tube 11 are scavenged by fresh air. The passage 19 is higher than passage 18 to permit the gases under pressure in tube 11 to expand before scavenging.

The device according to FIGS. 6 and 7 is very simple. However, it requires a difference between the pistons 16 and 17 since the passage 19 is higher than passage 18. Moreover, scavenging takes place in only one direction which provides different cooling of the pistons 16 and 17, since during each scavenging, in the passage 18 of piston 16, there is a flow of cool air, whereas in the passage 19 of piston 17, there is a flow consisting mainly of the relatively hot burnt gases contained in tube 11.

Figure 8:
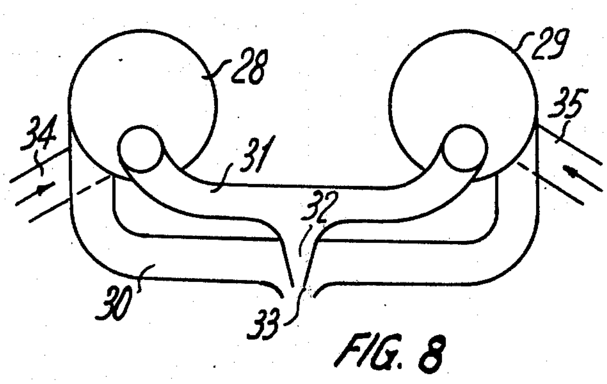
FIGS. 8 and 9 show a varied embodiment incorporating different scavenging means.
Figure 9:
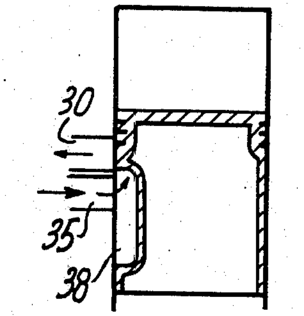

FIGS. 8 and 9 show a varied form of embodiment in which scavenging of the supercharging conduit is carried out symmetrically, evacuation of the burnt gases from this conduit taking place at the mid-point thereof. The engine comprises two cylinders 28 and 29 as well as an exhaust manifold 31 which receives the burnt gases evacuated by exhaust valves. The manifold 31 has an outlet nozzle 32 which is disposed coaxially within a nozzle provided in the middle of the tube 30 which forms the supercharging conduit. In this manner, the exhaust gases passing out through nozzle 32 generate a pressure drop which tends to remove via nozzle 33 the burnt gases contained in tube 30. In this case, the pistons moving in cylinders 28 and 29 are identical and each has, as shown in FIG. 9, a passage 38 enabling the setting up of a communication between air inlets 34, 35 respectively and the tube 30 forming the supercharging conduit. Consequently, upon each scavenging of tube 30, the scavenging air penetrates by each end thereof after having cooled the two pistons equally. The scavenging air is once more delivered by a blower, and the scavenging current is of course facilitated by the pressure drop generated in the nozzle 33 by the exhaust gases of nozzle 32.

Figure 10:
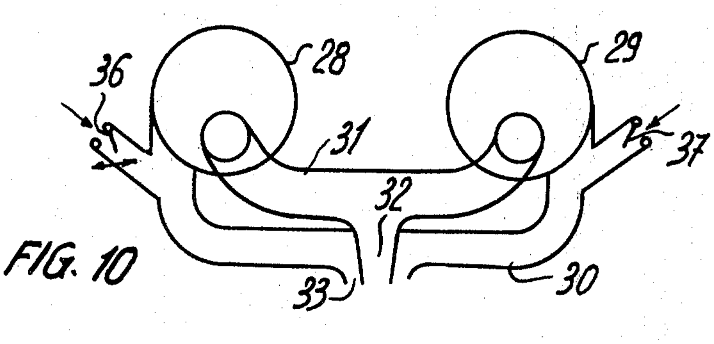
FIG. 10 shows a modification of the latter embodiment.

FIG. 10 shows a simplified variation of the embodiment of FIGS. 8 and 9, in which conventional pistons may be used, i.e. without passages 38. The scavenging air is delivered by a blower, and enters tube 30 by automatic valves 36, 37 respectively. Of course, these automatic valves could be replaced by any other automatic or mechanically controlled obturation member.

Of course, in the engines of FIGS. 8 to 10, it would be possible to employ an intermittent obturating member, for example a rotary plug valve, instead and in place of the nozzle 33 on tube 30. In this case, there can be an excellent supercharging efficiency while having a large evacuating section facilitating symmetrical scavenging of the tube between the supercharging periods.

The various described devices enable the following advantages to be obtained:

1.—The supercharging efficiency or output is greater than in conventional arrangements, since only the supplementary charge in the temporary communication conduit is compressed.

2.—The noise level is appreciably lowered, since the sound wave corresponding to the beginning of exhaust is not directed into the exhaust pipe but into the cylinder to be supercharged.

3.—The reaction time is immediate, during variations of the charge, which avoids the formation of smoke in the case of Diesel engines.

4.—The flexibility of the engine is increased, since the supercharging increases during reduction of the speed of the motor because of the increase of the time available for supercharging.

5.—A strong turbulence is provided in the cylinders, which has a favorable effect on the overall combustion of fuel in Diesel engines and on the homogeneity of the fresh gases in gasoline engines.

An interesting use of the invention is in engines provided with a turbocharger. As is known, the operational characteristics of turbochargers are good when the engine operates at high speeds. However, at low speeds, the supercharging effect obtained is practically zero. By using the temporary communication of the described devices, the maximum supercharging effect is provided at low speeds which compensates for the low supercharging pressure of the turbocharger, which results in an excellent supercharging for all speeds of operation of the engine.

Moreover, in the case of four-phase engines provided with a turbocharger, scavenging and the control of supercharging can be simply provided by connection to the inlet tube which is under pressure compared to ambient air pressure. Of course, emptying of the supercharging conduit must take place in the exhaust pipe downstream of the turbocharger turbine.

I claim:

1. In an explosion engine comprising a plurality of combustion chambers, at least one mobile member submitted to the pressures in said chambers, and means for setting up a temporary communication between two of said chambers which periodically have an overlap during periods at the beginning of an exhaust phase for one of said two chambers and the end of an intake phase of the other of said two chambers to employ the residual energy of exhaust gases in said one chamber to supercharge said other chamber at the end of its intake phase, said temporary communication means comprising a fixed conduit, each of said chambers having ports therein, said conduit having two ends each leading into a respective port, said ports disposed so as to be uncovered by said at least one mobile member during said periods, means for scavenging said conduit between said periods, fresh air inlet conduits communicating with each chamber, means connecting said ends of said temporary communication conduit with said fresh air inlet conduit, and means defining an orifice at a medium part of said temporary communication conduit for removal of burnt gases by the supply of fresh air.

2. An engine according to claim 1, including blower means connected to said inlet conduits for scavenging said temporary communication conduit.

3. An engine according to claim 1, in which said at least one member is a piston movably mounted in the respective chamber and including means defining in said piston a passage which periodically connects, between said periods, said port of said chamber with an inlet conduit and with an exhaust conduit to provide scavenging of said temporary communication conduit.

4. A motor according to claim 3, including an exhaust manifold, means defining a suction outlet in said exhaust manifold, said suction outlet being periodically connected by said passage in the piston to said temporary communication conduit to scavenge said temporary communication conduit.

5. A motor according to claim 2, including automatic valve means at each end of said temporary communication conduit for delivering scavenging air to said temporary communication conduit.

6. A motor according to claim 1, including at least one group of two cylinders each having a temporary communication conduit, and intermittent obturating means in said temporary communication conduit for preventing the free removal of exhaust gases therefrom at the beginning of each exhaust stroke of a cylinder to drive the air in said temporary communication conduit into the other cylinder which is at the end of the intake phase, and for then permitting the free outlet of burnt gases to allow scavenging of said temporary communication conduit by fresh gases.

* * * * *